United States Patent [19]
Camino

[11] Patent Number: 5,818,186
[45] Date of Patent: Oct. 6, 1998

[54] MULTIPLE IMPACT MOTOR DRIVE FOR STAPLING

[75] Inventor: Francisco Javier Camino, Jalisco, Mexico

[73] Assignee: Hewlett-Packard Company, Palo Alto, Calif.

[21] Appl. No.: 627,300

[22] Filed: Apr. 3, 1996

[51] Int. Cl.⁶ .................................................. H02K 17/32
[52] U.S. Cl. ........................... 318/434; 318/433; 318/280
[58] Field of Search ..................... 318/432–434, 318/280–300; 227/114–119, 132–147; 29/432, 432.1, 432.2

[56] References Cited

U.S. PATENT DOCUMENTS

| | | | |
|---|---|---|---|
| 4,380,312 | 4/1983 | Landrus | 227/116 |
| 5,230,457 | 7/1993 | Hiroi et al. | 227/2 |
| 5,440,215 | 8/1995 | Gilmore | 318/432 |

Primary Examiner—Brian Sircus

[57] ABSTRACT

An electric stapler is provided with current in multiple pulses in order to penetrate a thick stack of paper. The stapler is provided with current sufficient to staple a thin stack of paper. If the stapler does not complete its staple function after a time period corresponding to anticipated completion of the cycle, the current is interrupted. The current is then reapplied after the load on the stapler has attenuated. The reapplication of current results in a hammering action. This permits a thicker stack of paper to be stapled with a stapler which is optimized for the thin stack.

12 Claims, 3 Drawing Sheets

MULTIPLE IMPACT MOTOR DRIVE FOR STAPLING

FIELD OF THE INVENTION

This invention relates to electric motor controls. More particularly, the invention relates to the use of multiple power pulses to generate a multiple impact with a motor to drive staples and the like.

BACKGROUND OF THE INVENTION

This invention was developed as a result of a desire to provide improved automatic stapling of multiple paper sheets. The multiple paper sheets are provided as a result of operation of a paper handling machine such as an electrophotographic printer. The paper handling machine typically causes the paper to pass through a first process, such as printing, after which the paper is discharged to an output station. In many instances it is convenient to have the printer or other paper handling machine staple multiple sheets together.

While the invention can be used in a wide variety of applications, including staplers which are not associated with a larger paper handling machine, it will be described in connection with an electrophotographic printer. The printer has a, "mail boxing output device," which allows the printer's output to be sorted by categories. In some cases the mail boxing is sufficient to separate print jobs. In other instances, it is advantageous to provide the option of stapling print jobs, so that a stapled print job would be one of the printer output options.

It has been found that the stapling operation consists of the paper first being pressed to compress the stack. The paper is then punched, which consists of the staple being driven through successive sheets of paper in the stack. After the punch operation, the staple is clinched, wherein the ends of the staple are folded against an end stop, which functions as a collet. The pressing, punch and clinch operations are substantially continuous, in that the same application of force results in the compress, punch and clinch (staple fold) operations. In addition, since a fixed collet is used, the staple continues to be driven through the paper during the clinch operation. The paper continues to apply friction against the staple, even though the actual punch operation is complete during the clinch operation. Therefore, one mechanism typically causes the compression, punching and clinching operations.

The compress operation further can be separated into three functions. The stapler motor must first accelerated a driver from a home position to engagement of the stapler head with the paper stack. The paper is then lightly pressed down. This is typically accomplished by a sleeve through which the staple is guided. The staple then continues to compress the paper as the staple engages the paper, which means the paper is further compressed at the location where the staple is to penetrate. The primary difference between the stages of the pressing operation is that the pressing is initially accomplished by a staple guide applying pressure to the stack of paper, and then is continued as a result of the staple driving mechanism engaging the paper with the staple.

One type of stapler uses an electric motor which drives a gear and lost motion mechanism which drives a staple hammer. The electric motor is the prime mover and the staple hammer functions as the driver for driving the stapler. Electric activation of the motor causes the hammer to drop over the lead staple of a staple supply through a staple guide. The staple guide drops with the hammer against a stack of papers and will continue to guide the staple against a stack of papers. The hammer is spring biased away from a staple position.

The stapler cycle of a linear motor electric stapler is similar, except that the movement of the hammer is proportional to the movement of the linear motor.

In operating an electric stapler, it is necessary to provide electrical power sufficient to drive the staple through the maximum thickness of paper anticipated for use of the stapler. In the instant case it was intended to penetrate 20 sheets of 0.13 mm (5.1 mil) paper such as 75 g/m$^2$ (20 lb.) copy paper or 105 g/m$^2$ (28 lb.) typing paper. The maximum amount of sheets may vary depending on the application, but in the past, the ability to penetrate through a large number of sheets has been largely dependent on the maximum electric power consumption and therefor power, of the stapler. If one wanted to be able to achieve greater penetration, a larger motor and a larger power supply was required.

In one particular apparatus, a power supply was used for an output sorting mechanism, although the source of power would be expected to vary with the particular paper handling machine. If a stapler were designed to penetrate a large thickness of paper it would also have a tendency to leave a substantial impression or "footprint" on a small stack, such as two to four sheets of standard weight paper. It is often desired to have a reduced impression on the paper.

Increasing maximum power consumption requires that, in the case of an electronically controlled device, the power supply be able to handle the increased current. The wiring to the stapler must be sized to handle the increased load. If the stapler is operated simultaneously with the other major energy consumering components of the electrophotographic printer, the line power must be sufficient to supply the additional current draw of the stapler. If the stapler is to leave a light impression when used at less than maximum capacity, the power supply must be able to properly regulate the impact of the stapler. This becomes more difficult if the stapler is designed to provide an impact sufficient for a thick stack of paper.

Providing a larger capacity stapler also requires heaver equipment and associated costs.

Various mechanical devices have been used to increase impact of electrical machinery. These tend to add complexity to the mechanism, and in many cases increase noise. Ideally, a stapler capable of penetrating a substantial thickness of sheets at a printer output should be quiet enough to be acceptable in the office environment, even if stapling is a frequently used function. In other words, it is not acceptable for the stapler on a printer to sound like a carpenter's tack hammer.

It is possible to provide a clinch operation which is initiated only after the staple has completely been driven through the stack of paper. This reduces power consumed by working a metal staple while the staple is driven downward, but increases the complexity of the stapler in that the clinch operation is separately accomplished. Starting the clinch operation from the end of the staple provides a continuous work hardened clinched part of the staple which is stronger and at the same time easier to grip with a staple removing tool.

It is desired to increase the maximum capacity of the stapler without significantly increasing the time necessary to complete the stapling cycle. While the time to complete the stapling cycle is not significant when compared to the overall printing time cycle in an electrophotographic printer, the additional time of stapling is noticed by the user, often while the user is waiting by the printer. Therefore, this time should not be extended.

In choosing a particular stapler mechanism for use with a printer, we considered the convenience of designing the printer's output to accommodate the stapler, and power consumption. It is advantageous that the stapler receive its power from an existing power supply. While it is possible to drive the stapler at a higher current, this would have required providing a larger power supply or an energy storage device such as a capacitor. As mentioned above, the provision of a larger power supply would add to costs as a result of providing the necessary power handling capacity. In addition, the larger power supply would possibly increase the overall power consumption of the printer's output mechanism of the printer and possibly of the entire printer by a significant amount. In the case of an energy storage device, this would increase costs as the result of the necessary size of a capacitor or battery, as well as requiring an appropriate switching circuit.

It is possible to increase the capacity of a stapler by redesigning the stapler to apply with more force by "gearing down" the stapler. This results in the stapler operating slower. This slower operation affects all staple jobs, regardless of whether the particular staple job required the additional force.

It is the intent of this invention to increase the maximum thickness of stacked paper which may be penetrated with an automatic stapler. It is further the intent to use a relatively small capacity electric motor and increase the capability of the motor to drive staples through the increased thickness of stacked paper. It is desired to accomplish this without increasing the peak current or power consumption of the stapler. It is further desired to provide a stapler which is optimally designed to staple a relatively small stack of paper, and can be made to penetrate a significantly thicker stack. This would reduce equipment costs to approximately that necessary to staple the relatively small stack and optimize the stapling process for the small stack, yet still be able to perform the stapling operation on the significantly thicker stack.

It is further desired to provide a stapler which has a capability of selectively stapling small stacks of paper as well as large stacks, with an appropriate force applied to each. It is desired to provide the selective stapling without significantly increasing the complexity of the stapler and without significantly increasing the complexity of a control circuit.

SUMMARY OF THE INVENTION

In accordance with the present invention, a stapler is driven by an electric motor which is pulsed a plurality of times in order to penetrate relatively thick stacks of paper. The pulses are preferably each of a duration sufficient to complete a staple cycle on a predetermined thin stack of paper and result in the stapler completing a cycle on the thin stack. The motor is pulsed by applying power at a predetermined EMF and a predetermined maximum current.

By selecting a stapler which is optimally sized for a small stack of paper, the increased cost required to provide an ability to increase capacity for the thicker stack of paper is offset by avoiding the costs associated with providing a larger capacity stapler or power supply.

In one particular stapler, the motor required 1.3 A (amperes) of current at 24 volts for normal operation in which two to ten sheets of 0.13 mm (5.1 mil) 75 g/m$^2$ (20 lb.) paper are stapled. The duration of the pulse is 370–400 ms. In order to penetrate 20 sheets of 0.13 mm (5.1 mil) 75 g/m$^2$ (20 lb.) or 105 g/m$^2$ (28 lb.), a second pulse of current is applied. This increases the thickness of paper that the stapler is capable of penetrating. By selecting a timing between pulses, the paper remains compressed, and the subsequent pulse further penetrates the paper. Thus two or more pulses are applied in order to penetrate thicker stacks of paper.

The second pulse consumes more time, but it is only necessary to apply the second pulse when one pulse is inadequate to complete the staple job. Thus, time required to staple is increased only when a relatively thick stack of paper is stapled.

The thickness of the stack to be penetrated is limited by the physical ability of the staple to remain straight during the penetration operations and by the increased friction of the paper which may approach or exceed the force which can be applied by successive pulses of the motor.

DETAILED DESCRIPTION OF THE INVENTION

Figure 1:
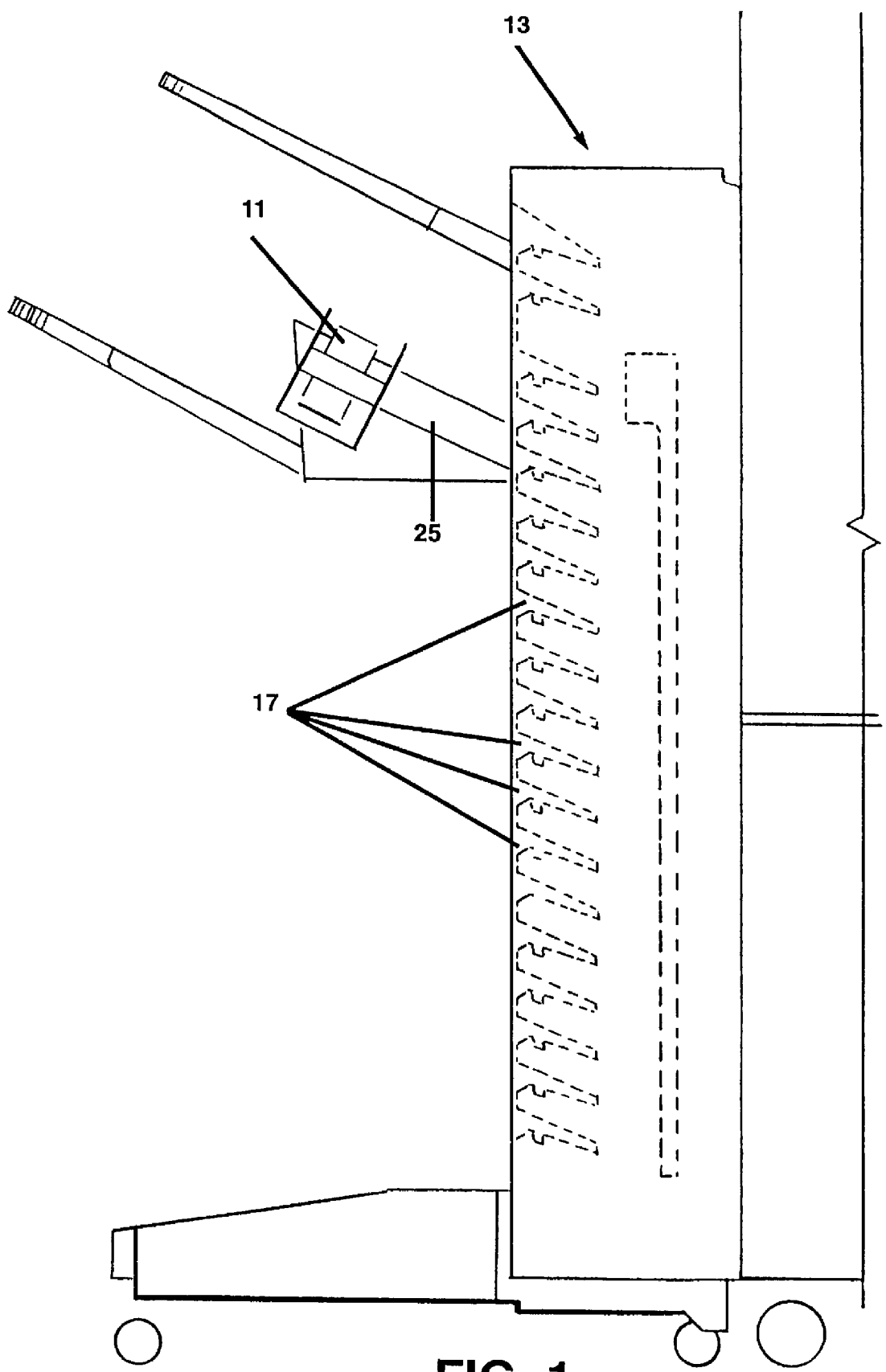
FIG. 1 shows an output section of a printer, in which a stapler is provided, as in the preferred embodiment of the invention.
Figure 2:
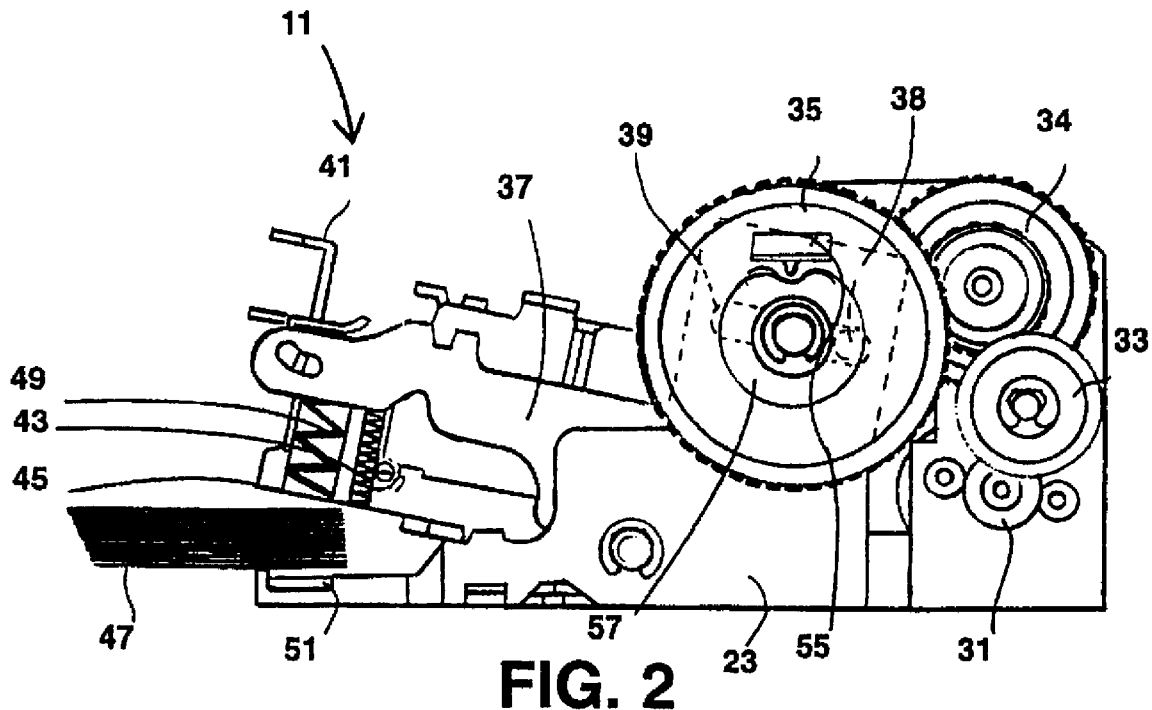
FIG. 2 shows a configuration of a stapler mechanism used with the preferred embodiment of the invention. In this figure, the stapler's driver is at a rest position.
Figure 3:
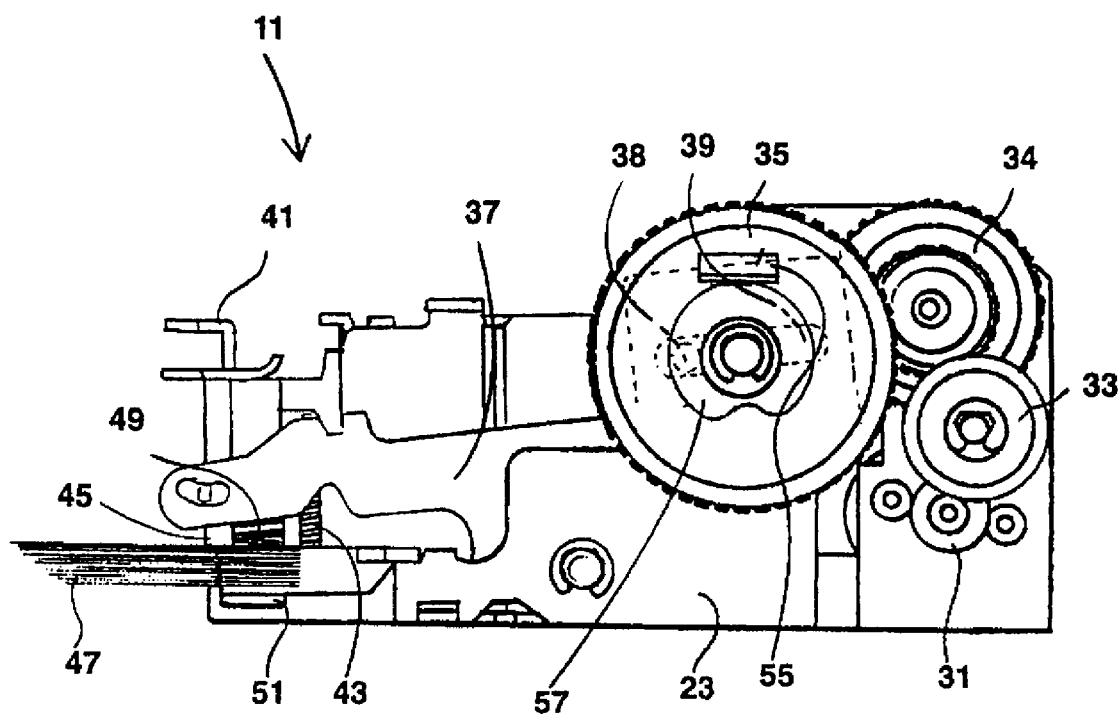
FIG. 3 shows the stapler mechanism of FIG. 2, with the stapler's driver at a "home" position consistent with completion of a staple operation.

This invention relates to a stapler mechanism 11, shown in FIGS. 1–3. In the preferred embodiment, the stapler mechanism 11 is used in an output sorter 13 of a printer as shown in FIG. 1. The output sorter 13 has multiple output trays 17. Sheet media, typically paper which is processed by the printer, is selectively discharged into the different output trays 17. This configuration permits the printer to have a "mailbox" output, whereby printed sheets are selectively placed in different slots.

The inventive stapler forms a part of the output sorter 13, although it is possible to implement the invention separately from a printer or the output sorter 13. The stapler consists of body 23 which is mounted to a stapler carrier 25. The stapler carrier 25 is preferably mounted to the output sorter 13 at a first output tray 19. This is advantageous because stapled print jobs are by definition pre-bundled, as opposed to being groups of loose sheets.

It is alternately possible to provide a stapling function such that the stapled print jobs may be discharged to any of the output trays 17. Alternatively, the stapler carrier 25 may be positioned to align such that if the output sorter 13 aligns an output tray 17 to receive the sheet media from the printer, the stapler carrier 25 is aligned with that particular tray 17. In that case, when the tray 17 has received printed sheets of sheet media, the stacked print media are aligned beneath the stapler mechanism 11.

FIG. 2 shows a typical electric stapler mechanism 11 which is used in the preferred embodiment of the invention. In the preferred embodiment, the stapler body 23 is positioned at an angle above the discharge tray so that the stapling operation is accomplished by movement at the same angle from the discharge tray 17. As a matter of convention, the direction of motor movement toward the tray is considered to be "downward" and away from the tray is considered to be "upward." It is understood, however, that these references of "upward" and "downward" are at variance with the vertical by the angle of the discharge tray. The invention is not directly dependent on the position of the discharge tray, so that the angle of variation can be up to 360°.

The stapler body 23 houses and supports a motor 31 and gears 33, 34, 35. A lost motion lever 37 is driven by pin 38 through a slot 39, and the lever 37 in turn drives a hammer 41. The hammer 41 in a downward movement engages a grip spring 43, which in turn biases a grip 45 downward, against a stack of paper. The stack of paper is represented as stack 47.

The hammer 41 is biased upward with a return spring 49. The return spring 49 assists the hammer 41 in its return to a rest position, shown in FIG. 2. It is possible for power to the motor 31 to be interrupted, as is the case with a failed cycle or a cycle exceeding a time period anticipated for completion of the cycle. Without the return spring 49, the hammer 41 would be left in a position other than the rest position. The return spring 49 causes the hammer 41 to return to the rest position. This also urges the lost motion lever 37 and gear 35 to corresponding rest positions. (Gears 33, 34 do not necessarily have fixed rest positions, but would rotate until gear 35 reaches its rest position. Springs 43 and 49 are shown above the stack of paper 47 for clarity. In the preferred embodiment, the springs 43, 49 are located away from the stack of paper 47.

Significantly, the hammer 41 in its downward movement also engages an individual staple from a supply of staples and drives the staple downward through the stack 47. A collet 51 is mounted on the discharge tray opposite the hammer head 41. This is the part of the stapler which receives the staple after the staple has penetrated the paper. Groves in the collet 51 fold the staple when the hammer 41 continues to force the staple downward, thereby allowing the stapler 11 to complete the "clinch" operation.

The stapler 11 achieves its purpose as a result of the force of the motor 31 driving the hammer 41. In the preferred embodiment, the motor 31 is a DC motor, although it is possible to provide an AC motor. The motor behaves according to:

$$T_{ind} = K\phi I_A \quad (1)$$

$$E_A = K\phi\omega \quad (2)$$

$$I_A = (V_T - E_A)/R_A \quad (3),$$

where
$T_{ind}$ is the induced torque; $I_A$ is the magnetic coil current; $E_A$ is the induced EMF (voltage); $\omega$ is the angular velocity; $V_T$ is the applied EMF (voltage); and $R_A$ is the magnetic coil resistance.

Let $\omega$ be the velocity of a motor 31 at $V_T$, for a given load ($T_{load}$). If $T_{load}$ increases, $\omega$ decreases, which causes $E_A$ to decrease. This is shown in equation (2). In a stable condition, $T_{ind} = T_{load}$. This shown in equation (1). A stalled condition occurs when $I_A$ cannot be increased enough to reach the condition $T_{ind} = T_{load}$. In that case, the circumstance of $T_{ind} < T_{load}$, and the motor 31 is in a condition where the stapler stalls and therefore is no longer proceeding with the stapling function.

Thus, if the load increases with time in a discrete manner, the current will follow this behavior, and the motor will be able to hammer the staple until $T_{ind}$ is less than that required to move the staple. As each step in the stapling operation occurs, the demand of current keeps increasing even though the previous step has already ended. This is because, even if the previous step has decelerated the motor and the motor generates electrical inductive reaction. (Inductors reject sharp current changes.)

It was determined that 1.34 amperes is a desired maximum current which will be supplied to the stapler mechanism 11 in the preferred embodiment. This current level was chosen in order to allow an existing power supply to operate the stapler mechanism 11. This current is applied for a pulse duration of 370–400 ms.

It was found that this application of power to the motor 31 was not sufficient to staple 20 sheets of 0.13 mm 75 g/m$^2$ (20 lb.) copy paper or 105 g/m$^2$ (28 lb.) typing paper. The duration of the pulse could be extended in order to complete the clinch operation, but if the stack were thick enough, the motor would stall and $\omega$ would go to zero. As a result, extending the 370–400 ms time period would not result in completing the stapling operation. In order to staple the 20 sheets, a second pulse is applied after an interruption in the current to the motor 31.

Figure 4:
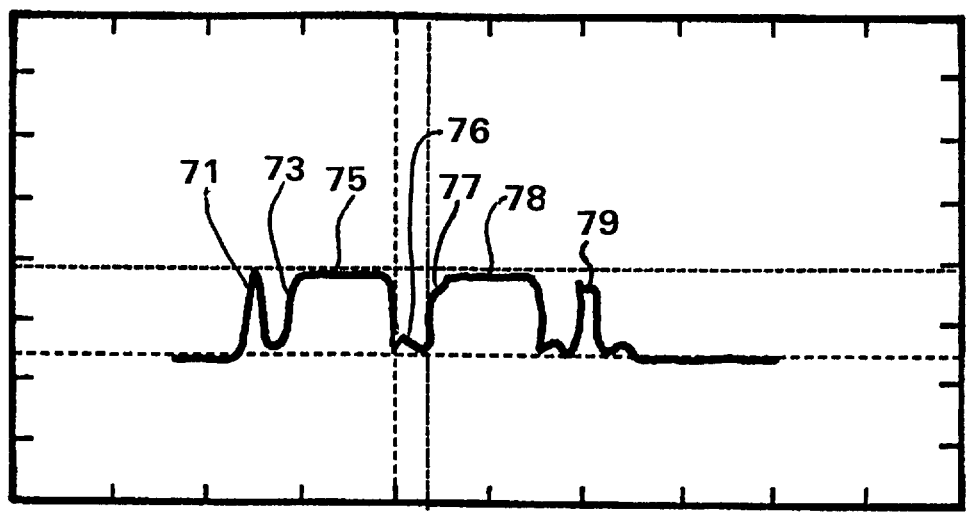
FIG. 4 graphically shows current supplied to the stapler in order to achieve a multiple strike capability.

FIG. 4 shows current applied to the motor over time, with an interruption of the current. It was found that by interrupting current to the motor 31 (FIGS. 2 and 3) at the end of the 370–400 ms time period, the motor 31 could again be started and thereby cause the hammer 41 to strike the staple again, with the motor 31 again operating with a value of $\omega$ which is greater than zero. The interruption of the current results in the motor 31 being energized twice. This effectively causes the hammer 41 to perform multiple strikes.

This pulse is preferably applied if gear 35 does not reach a target or "home" position corresponding to a completed staple operation in a normal cycle time, as shown in FIG. 3. If the gear 35 does not reach the "home" position, the mechanism will allow the gear 35 to eventually return to a start or rest position as shown in FIG. 2 after the motor is deenergized.

In order to staple 20 sheets of 0.13 mm 75 g/m$^2$ (20 lb.) copy paper or 105 g/m$^2$ (28 lb.) typing paper, a second pulse of current is applied to the stapler mechanism 11. This pulse is preferably applied if the armature 32 does not reach a target position corresponding to a completed staple operation, as shown in FIG. 3, in a normal cycle time. In the preferred embodiment, this cycle time is the 370–400 ms pulse duration.

In our experiments, we used 21 sheets and provided 22 volts in order to provide a margin for error. This provides assurance that the stapler is able to penetrate the 20 sheets when provided with the supply current of up to 1.3 amperes at 24 volts.

If the hammer 41 does not reach the target or "home" position in the normal cycle time, the current to the motor 31 is interrupted and the hammer 41 is permitted to return to a rest position, as shown in FIG. 2. In the preferred embodiment, this is accomplished by permitting the hammer 41 to drive the lost motion lever 37 and the gears 33, 34, 35 backwards, although it is possible to design the stapler mechanism to allow the motor 31 to complete its cycle regardless of the success of the hammer 41 reaching its target position.

The "home" position, shown in FIG. 3, is sensed by a cam operated switch 55, which is controlled by a cam 57. The cam 57 is located on gear 35, so that the switch 55 will sense gear 35 completely rotating. Complete rotation of gear 35 indicates a complete staple cycle has been successfully performed.

It is not necessary that the hammer return completely to the rest position of FIG. 2, but merely that the hammer 41 retract sufficiently from engagement with the staple to permit the motor 31 to restart and gain substantial speed before reengaging the staple. In the preferred embodiment, the motor 31 does return to the rest position.

In the preferred embodiment, the interruption of current is timed to agree with an anticipated cycle time, which in the preferred embodiment is the 400 ms maximum pulse duration. If the cam 57 has not reached the "home" position after this anticipated cycle time, the current to the motor 31 is interrupted and the hammer 41 is allowed to withdraw from engagement with the stack of paper 47. After current is again supplied to the motor (in the correct phase for driving the hammer 41 downward), the hammer 41 again engages the stack 47.

It is alternatively possible to sense the actual return position of the hammer 41 or other component of the stapler mechanism 11 or staple. By allowing the hammer 41 to return to the rest position, the load on the motor 31 at startup imposed by the staple is removed.

The motor 31 acts as an inductor. Therefore, when the current is interrupted, the motor 31 will not immediately return at a rate consistent with a no power condition. There is a slight "back EMF" which is the result of the inductive characteristic of the motor 31 and the resultant collapse of the electromagnetic field formed when the motor 31 was energized. As a result, when power supplied to the motor 31 is interrupted, electromagnetic force continues to exist in the motor 31. (Current could continue to flow, depending on the particular switching circuit used.) This is the result of induction and induced EMF resulting from the motor being moved by the springs. Referring to FIG. 4, the time period between successive strikes includes the time delay caused by the motor 31 remaining energized.

Figure 5:
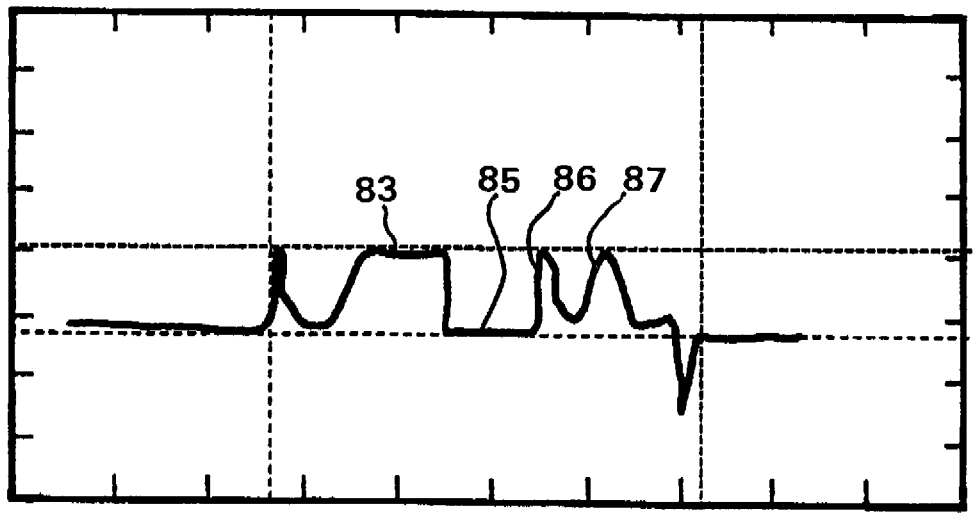
FIG. 5 graphically shows current supplied to the stapler, with an interceding reversal of phase in order to expedite the multiple strike process.

FIGS. 4 and 5 show EMF applied to the stapler motor 31 over time. In FIG. 4, a first application of current causes a voltage spike, at the location 71 on the graph. After the EMF drops off, the EMF increases as the stapler 11 engages the stack of paper 47 (FIGS. 2–3). The increase in EMF is seen at 73. The motor 31 stalls when $T_{ind}$ is insufficient to cause the staple to penetrate the stack of paper 47. This is the flat spot shown at location 75. (It is possible that there is some small amount of movement of the motor 31 during that time period, but this would not be sufficient to assure penetration of the stack 47.)

After a time period, as indicated at 75, current to the motor is interrupted, shown at 76, and then reapplied, shown at 77. The motor 31 again stalls, shown at 78, requiring a third strike, shown at 79. In this example, the motor 31 does not stall, and lower EMF is measured at the time of the third strike 79.

In FIG. 5, current is applied to the motor 31, resulting in a stalled condition, shown at graph location 83. Current applied to the motor 31 is then reversed in phase, resulting in a 0 volt condition, shown at 85. A second strike, shown at 86 (motor 31 restarting) and 87 (hammer 41 striking staple) resulted in penetration of the stack of paper 47.

As is shown in FIG. 5 at graph location 85, in order to reduce the delay caused by this back EMF, the phase of the EMF applied to the motor is inverted. This speeds the return of the motor 31 to the rest position. The application of EMF at an inverted phase furthers the interruption of current to the motor 31 because the result of the inverted phase EMF is to cause current to flow in the opposite direction. Therefore, in the sense of the invention, the reversal of phase is consistent with and is a part of the interruption of current to the motor. In the preferred embodiment, the interruption of current is accomplished by an "H" bridge of four transistors, so that applied EMF is reversed in phase during the interruption.

The result of the interruption in current is to reduce the load on the motor 31 upon application of energy a subsequent time after said interruption. The interruption in current causes a reversal in the motor 31, which in turn reduces the load on the motor 31. The reduced load permits the motor 31 to restart under said reduced load when current is again supplied to the motor 31 (with the EMF not reversed).

After the hammer 41 returns to the rest position, the current is again pulsed back on in order to complete a subsequent cycle. If after a predetermined number of attempts, the stapling operation is not completed, the pulsing of the motor is ceased. In the preferred embodiment, the motor is pulsed a maximum of two times, although it is also contemplated that three attempts may be used. The number of attempts is determined empirically, taking into consideration a desire to avoid improperly folded staples.

The motor 31 is restarted after the interruption of current to the motor 31. The load on the motor 31 at this subsequent startup consists primarily of the springs 43, 49 and the momentum and friction of the mechanism. When the hammer 41 again engages the staple, the motor 31 is at an operating speed ω which corresponds to the operation of the stapler mechanism with a light load.

As a result, when the hammer 41 engages the staple after interruption, the hammer has a downward velocity consistent with a no load condition. The motor 31 is operating at an optimum speed for providing force to the hammer 41. The hammer 41 also provides additional force to the staple as a result of the momentum of the hammer 41.

It was found that with two forward pulses applied to the motor 31, it was possible to staple 20 sheets 105 g/m² (28 lb.) typing paper with the 1.3 A available current. The additional pulses impose a time penalty, but this is considered to be approximately that of the time penalty of a stapler which is able to use a single pulse at the 1.3 A maximum current to penetrate the 20 sheets. Moreover, the increase in time is only seen when a second strike is required.

Advantageously, the use of the reduced force applied by the stapler results in the stapled stack of paper being left with a reduced impression when only a single strike is necessary. While this is not always significant, it is sometimes desirable to have stapled sheets which are not stapled excessively tightly together. Staples applied with reduced force, particularly in the "clinch" operation, tend to be easier to remove and cause less damage to the sheets. By applying the additional force necessary to complete the staple operation on relatively thick stacks only on the relatively thick stacks, the tightness of the staple is more optimum for relatively thin stacks.

The above description relates specifically to the preferred embodiment of a rotary motor driving a stapler used in the output mechanism of a printer. It is possible to use the inventive concepts in other applications. As an example, it is possible to use the inventive techniques to drive staples with a linear electric motor or with a pneumatic motor. The techniques can be used of other types of outputs, such as an impact wrench. Accordingly, the invention should be read as limited in scope by the claims.

What is claimed is:

1. A method for operating an electric motor comprising:
   a. supplying current to the electric motor;
   b. interrupting the current to the electric motor;
   c. reducing a mechanical load on the electric motor in response to said interruption of the current;
   d. in the case of continued operation of the electric motor, supplying current to the electric motor a subsequent time after said interruption, the reduced load permitting the motor to begin operation the subsequent time with a mechanical resistance which is significantly less than when said current to the electric motor was interrupted, thereby causing the motor to advance beyond a position which would have been reached through continuous operations;
   e. using said electric motor as a prime mover for operating an electric stapler by causing a staple driver to initiate a staple operation;
   f. said current supplied to the motor providing sufficient force to staple media having a predetermined resistance to stapling;
   g. said application of current a subsequent time providing sufficient force to staple media having a resistance to stapling greater than said predetermined resistance; and
   h. in the case of the staple driver completing the staple operation, not applying said energy the subsequent time, thereby reducing an impression made on the media when the media does not exceed said redetermined resistance to stapling, thereby applying of further energy on sheet media having the resistance to stapling greater than said predetermined resistance.

2. The method of claim 1 further comprising:
   sensing a stall condition of the electric motor after said initiation of movement and responding to said sensed stall condition with said interruption in the current to the electric motor.

3. The method of claim 1 further comprising:
   upon interrupting the current to the electric motor, causing current to flow in an opposite direction during the interruption of said electric current.

4. The method of claim 1, further comprising:
   said interruption of the current to the electric motor allowing a mechanical load on the motor to attenuate.

5. The method of claim 1, further comprising:
   causing a reversal in the driver during said interruption of the current, said reversal reducing said load on the electric motor and thereby permitting the electric motor to restart under said reduced load upon application of current said subsequent time after said interruption.

6. A method for operating an electric motor comprising:
   a. supplying current to the electric motor;
   b. interrupting the current to the electric motor;
   c. reducing a mechanical load on the electric motor in response to said interruption of the current;
   d. in the case of continued operation of the electric motor, supplying current to the electric motor a subsequent time after said interruption, the reduced load permitting the motor to begin operation the subsequent time with a mechanical resistance which is significantly less than when said current to the electric motor was interrupted, thereby causing the motor to advance beyond a position which would have been reached through continuous operation; and
   e. upon interrupting the current to the electric motor, causing current to flow in an opposite direction during the interruption of said electric current.

7. The method of claim 6 further comprising:
   sensing a stall condition of the electric motor after said initiation of movement and responding to said sensed stall condition with said interruption in the current to the electric motor.

8. The method of claim 6, further comprising:
   said interruption of the current to the electric motor allowing a mechanical load on the motor to attenuate.

9. The method of claim 6, further comprising:
   causing a reversal in a staple driver during said interruption of the current, said reversal reducing said load on the electric motor and thereby permitting the electric motor to restart under said reduced load upon application of current said subsequent time after said interruption.

10. A method for operating an electric motor comprising:
    a. supplying current to the electric motor, wherein the current provides sufficient force to work media having a predetermined resistance;
    b. interrupting the current to the electric motor;
    c. reducing a mechanical load on the electric motor in response to said interruption of the current;
    d. in the case of continued operation of the electric motor, supplying current to the electric motor a subsequent time after said interruption, causing current to flow in an opposite direction during the interruption of said electric current, the reduced load permitting the motor to begin operation the subsequent time with a mechanical resistance which is significantly less than when said current to the electric motor was interrupted, thereby causing the motor to advance beyond a position which would have been reached through continuous operation, and wherein said application of current a subsequent time provides sufficient force to work media having a resistance greater than said predetermined resistance; and
    e. in the case of work media having a less than predetermined resistance, not applying said energy the subsequent time, thereby reducing work applied to the media when the media does not exceed said predetermined resistance.

11. The method of claim 10 further comprising:
    using said electric motor as a prime mover for operating an electric stapler by causing a staple driver to initiate a staple operation.

12. The method of claim 10 further comprising:
    sensing a stall condition of the electric motor after said initiation of movement and responding to said sensed stall condition with said interruption in the current to the electric motor.

* * * * *